United States Patent [19]

Clement

[11] 4,073,395
[45] Feb. 14, 1978

[54] TRUNK LOADING APPARATUS

[76] Inventor: Clyde H. Clement, 8439 N. 13th Place, Phoenix, Ariz. 85020

[21] Appl. No.: 765,943

[22] Filed: Feb. 7, 1977

[51] Int. Cl.$^2$ ............................................. B60R 9/00
[52] U.S. Cl. .................................. 214/450; 224/42.44
[58] Field of Search ....................... 214/450, 451, 453; 224/42.43, 42.44, 42.21

[56] References Cited

U.S. PATENT DOCUMENTS

| | | | |
|---|---|---|---|
| 2,063,598 | 12/1936 | Franklin | 214/451 |
| 2,778,517 | 1/1957 | Weinstein et al. | 214/450 |
| 3,011,669 | 12/1961 | Sylvester | 214/450 |
| 3,115,978 | 12/1963 | Anderson, Jr. et al. | 214/450 |
| 3,807,592 | 4/1974 | Lynn et al. | 214/450 |

FOREIGN PATENT DOCUMENTS

| | | | |
|---|---|---|---|
| 658,618 | 2/1963 | Canada | 214/450 |

*Primary Examiner*—Lawrence J. Oresky
*Assistant Examiner*—Ross Weaver
*Attorney, Agent, or Firm*—Drummond, Nelson & Ptak

[57] ABSTRACT

An automobile trunk loading apparatus for loading wheelchairs, outboard motors and the like into the trunk of an automobile comprises a carrier frame on which the object to be located may be removably attached. The frame is connected at the end which is to extend into the interior of the trunk to a pair of chain-like track elements which are constructed of interconnected oppositely facing U-shaped channel links having engaging surfaces to limit the radius of curvature attainable by the chain in the direction extending upwardly from the trunk floor to a minimum radius and to limit the radius of curvature on the opposite side thereof to approximately a straight line. When an object is located in the trunk in a loaded position, the chain-like track elements lie flat on the floor of the trunk. To remove an object, the frame nearest the edge of the trunk is lifted up sufficiently to clear the trunk and then pulled horizontally out of the trunk. The chain-like track members roll up link by link and then straighten out to lift the opposite end of the frame upwardly out of the trunk. When the end of the frame to which the track elements are connected clears the edge of the trunk, the free end is lowered to the ground and the object carried by the frame may be removed from it. To load the trunk, the procedure is reversed.

10 Claims, 7 Drawing Figures

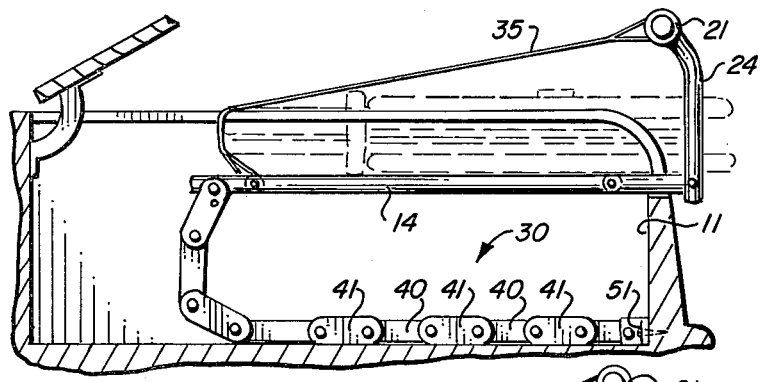
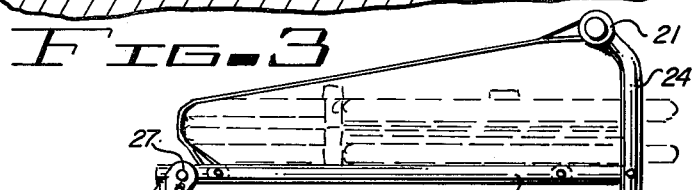
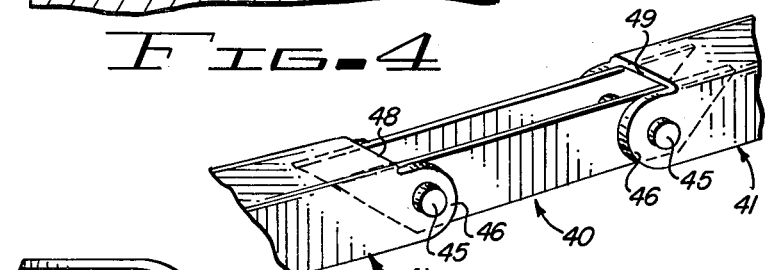
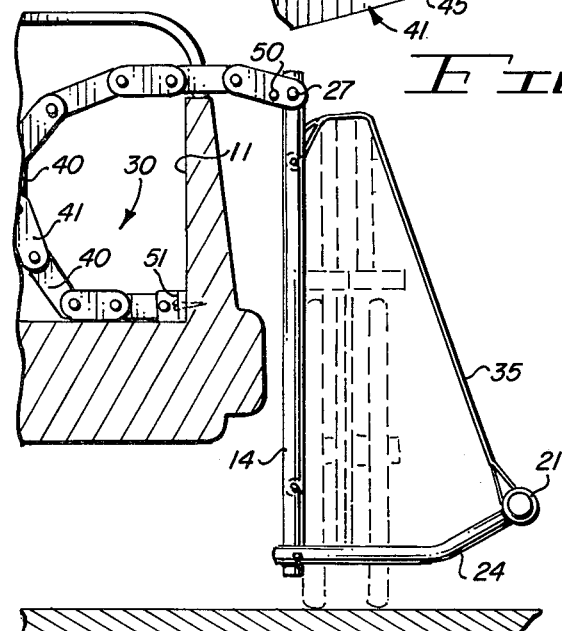
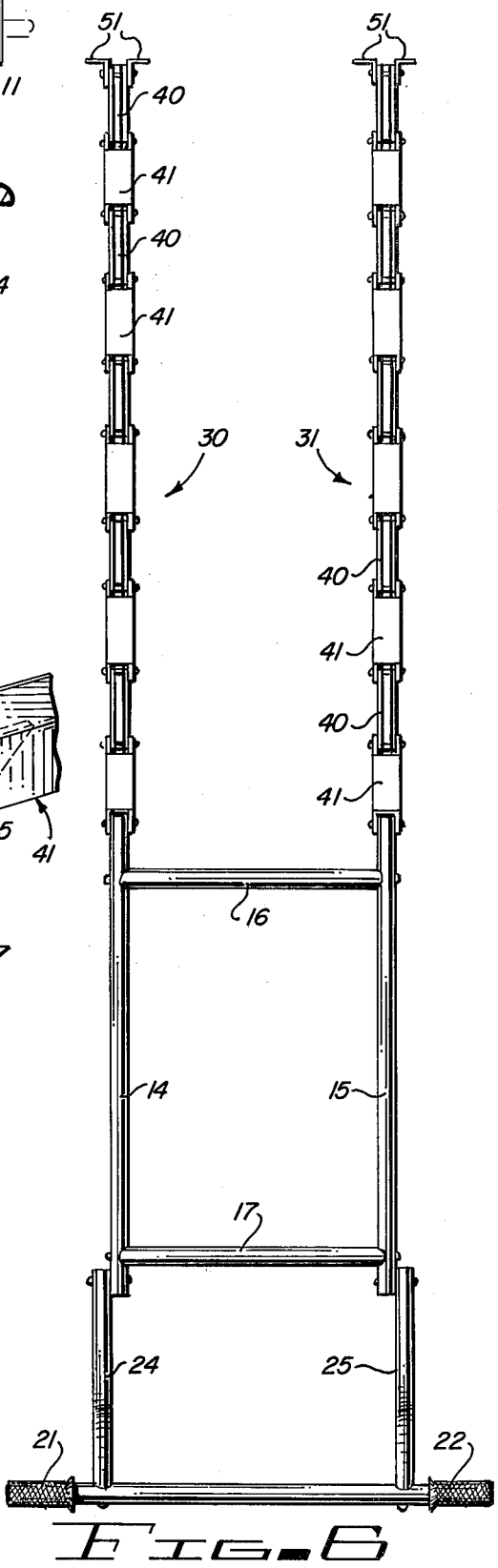

TRUNK LOADING APPARATUS

CROSS REFERENCE TO INVENTION DISCLOSURE

The present application pertains to and arises from material submitted to the U.S. Patent Office on Aug. 17, 1976 in Invention Disclosure No. 051793.

BACKGROUND OF THE INVENTION

The loading of bulky or heavy articles into automobile trunks is difficult because a person must stand behind the automobile, bend over and reach forward to place objects into the trunk or remove them from it. When an object is heavy or unwieldly such as a folded up wheelchair, outboard motor or the like, a substantial strain is imparted to the back of the person who is doing the loading or unloading. Many persons simply do not have the strength to load or unload objects of this type from an automobile trunk.

Various types of apparatus have been developed for facilitating the loading of golf bags, wheelchairs, outboard motors, etc. into the trunks of automobiles. While such apparatus generally is capable of reducing the strain required to accomplish the loading, the apparatus itself is cumbersome, difficult to install, and expensive to manufacture. Several attempts at solving this problem exist but in all cases require a rather substantial frame to be mounted into the trunk of the vehicle. The loading apparatus then require special pallets with rollers or cumbersome lever arrangements.

In addition to being complex and cumbersome, trunk loading apparatus generally require a number of mounting brackets or attachments to be used to interconnect the frame of such apparatus to the floor of the trunk of the vehicle. Some apparatus even require a modification of the structure of the trunk interior or trunk edge in order to accommodate the loading apparatus.

It is desirable to provide a simple trunk loading apparatus which may be quickly and easily installed into and removed from a vehicle and which, in operation, may even be used by persons of relatively limited strength to easily load and unload unwieldly or heavy articles into and from the trunk of an automobile.

SUMMARY OF THE INVENTION

Accordingly, it is an object of this invention to provide an improved trunk loading apparatus.

It is another object of this invention to provide an improved trunk loading apparatus which is simple to install and easy to use.

It is an additional object of this invention to provide an improved trunk loading apparatus which facilitates the upward lifting and removal of objects from the trunk of an automobile.

It is a further object of this invention to provide an improved trunk loading apparatus which is adapted for universal use in a wide variety of automobile trunk configurations.

In accordance with a preferred embodiment of this invention, an improved trunk loading apparatus includes a frame having first and second ends for supporting an object which is to be loaded into an automobile trunk. The frame is adapted to lie substantially flat in the trunk, and the end which is remote from the rear edge of the trunk is attached to one end of a chain-like track comprised of a plurality of pivotally attached interconnected links. The other end of the track is attached to the interior of the trunk compartment adjacent the trunk opening at the rear edge; so that when the apparatus is in the trunk in the loaded position, the track extends in a straight line on the bottom of the trunk. The other end of the frame may be lifted up to clear the trunk edge and then pulled horizontally out of the trunk. The track links have mutual engaging portions which limit the minimum radius of curvature which is attainable by the track; so that as the track rolls up in response to the withdrawal of the support frame horizontally out of the trunk, it lifts up the end of the support frame located within the trunk to cause the frame to clear the edge of the trunk. Once the frame has been withdrawn from the trunk, the end which was first lifted out of the trunk may be dropped to the ground, and the track supports the other end above the trunk edge. In this position, any objects carried by the frame then may be readily removed from the frame or an object to be loaded into the trunk may be placed on the frame and attached to it for subsequent loading into the trunk, which is a reverse of the procedure described above for unloading the trunk.

BRIEF DESCRIPTION OF THE DRAWINGS

FIGS. 3, 4 and 5 illustrate different positions assumed by the embodiment of the invention shown in FIGS. 1 and 2 during unloading and loading operations;

FIG. 6 is a top view of a preferred embodiment of the invention; and

FIG. 7 shows the details of a portion of the structure used in the embodiments of FIGS. 1 through 6.

DETAILED DESCRIPTION

Figure 1:
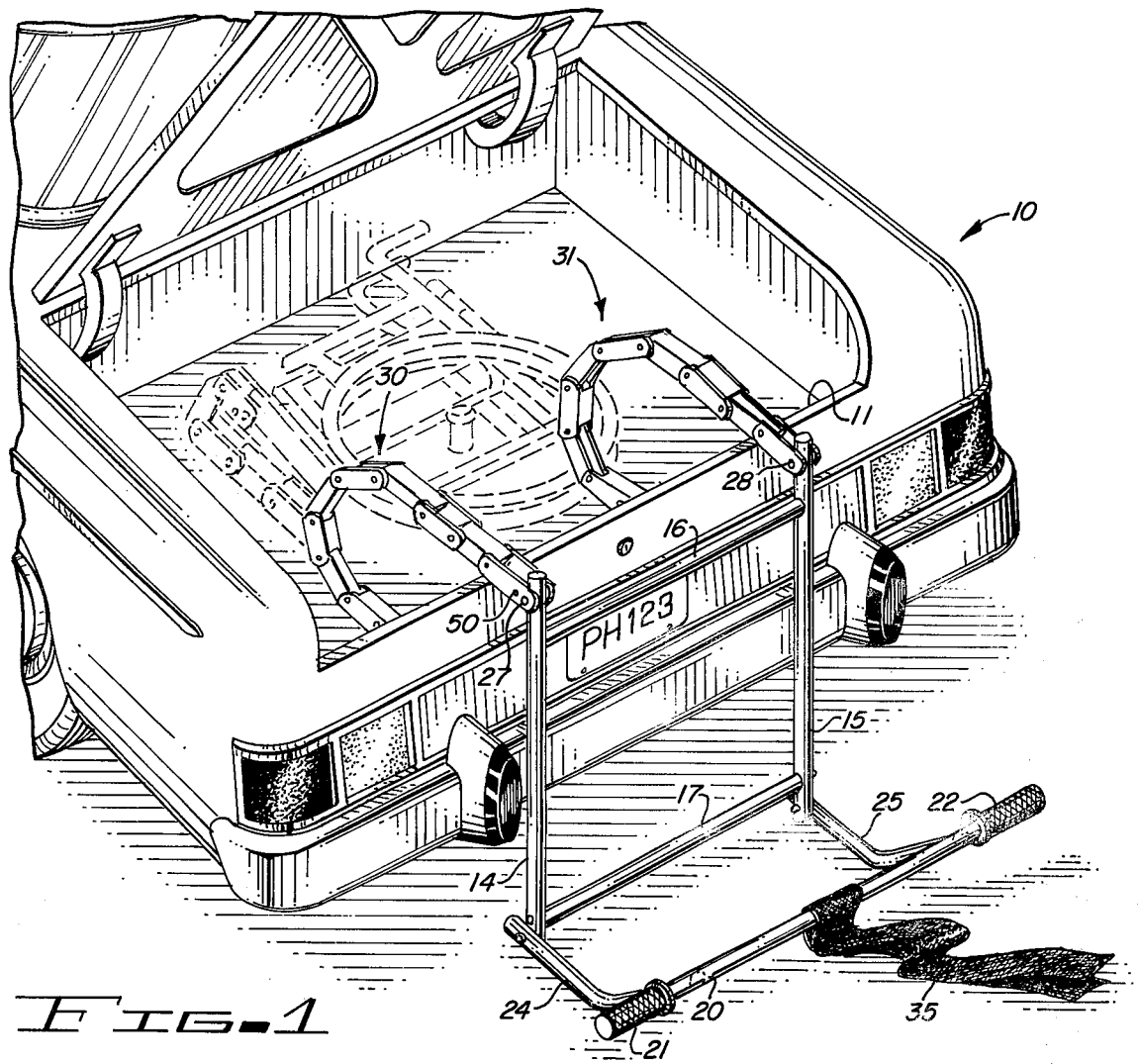
FIG. 1 is a perspective view of a portion of a vehicle showing an open trunk with a preferred embodiment of the invention shown used in conjunction with it.

Reference now should be made to the drawings in which the same reference numbers are used throughout the several figures to designate the same components. FIG. 1 illustrates the rear portion of an automobile 10 showing an open trunk compartment. The trunk compartment illustrated is typical and of the type commonly employed in most automobiles. When the trunk lid is opened as shown in FIG. 1, the truck compartment may be loaded with various items, or items previously stored in the trunk compartment may be removed from it. The rear end of the trunk compartment located at the rear bumper of the car generally comprises an upright rear edge 11, the height of which varies somewhat from make to make of different automobiles. In general, however, this rear edge 11 is 6 inches or more in height.

To facilitate the loading and unloading of heavy or unwieldly objects, such as wheelchairs or outboard motors, into the trunk compartment of the automobile, a trunk loading apparatus is attached to the inside of the rear edge 11 of the trunk compartment where it joins with the floor of the compartment.

As shown, this trunk loading apparatus comprises a frame for supporting an object to be loaded. The frame is constructed of two elongated tubular side members 14 and 15 which are joined together at opposite ends by a pair of tubular cross support members 16 and 17. These frame members preferably are formed of tubular aluminum or other suitable material of approximately 1 inch diameter. The size of the frame formed by the members 14, 15, 16 and 17 is sufficient to support the object which is to be loaded into the trunk. In the drawings, this object is illustrated as a wheelchair; but the apparatus could equally as well be used to load outboard motors, golf bags or other objects into the trunk of the vehicle.

A handlebar 20 having handgrips 21 and 22 on its opposite ends is pivotally attached to the bottom of the side members 14 and 15, as shown in FIG. 1, by a pair of tubular extension members 24 and 25. When the ends of the side members 14 and 15 touch the ground, the extensions 24 and 25 lie along the ground. These extensions are slightly upturned at the ends where they attach to the handlebar 20, so that the handgrips 21 and 22 have sufficient clearance from the ground to permit them to be grasped by a person using the loading apparatus.

Figure 2:
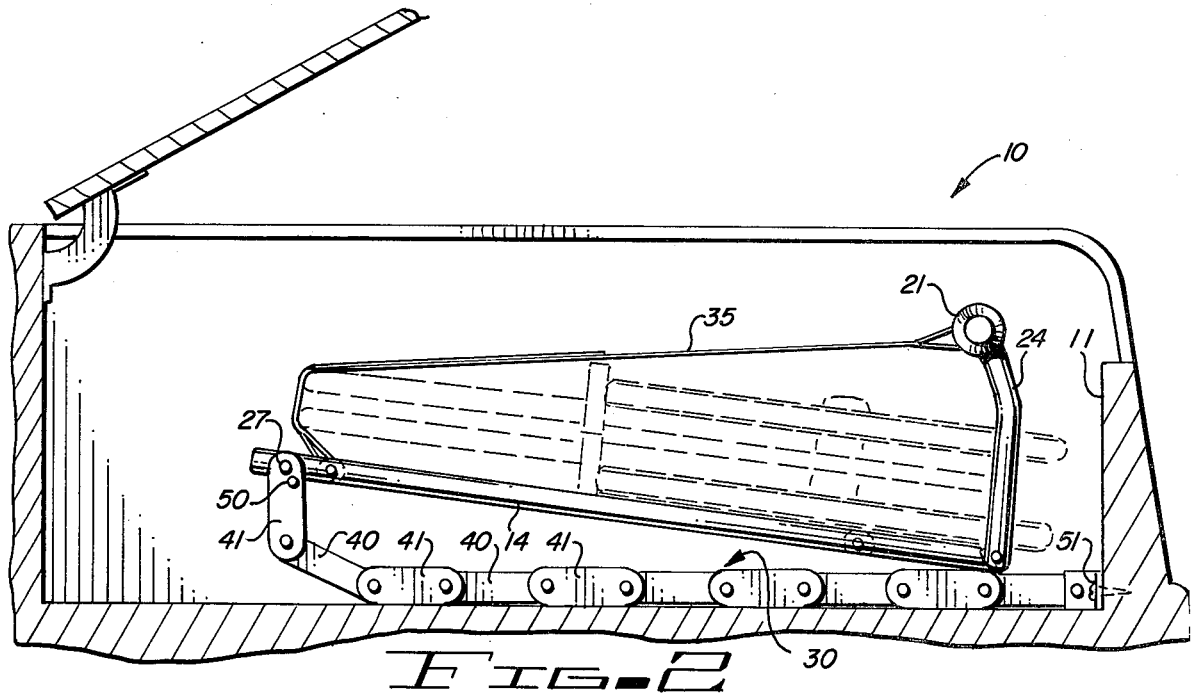
FIG. 2 is a cross-sectional side view of the trunk portion of the vehicle shown in FIG. 1 with the trunk loading apparatus shown in its loaded position within the trunk of the vehicle.

The upper ends of the side members 14 and 15 are pivotally mounted on pivot pins 27 and 28 to the end links of a pair of chain-like linkages or tracks 30 and 31, the other ends of which are attached to the rear edge 11 of the trunk compartment on the inside by brackets 51 and suitable self-tapping screws or other fastening devices, as shown most clearly in FIG. 2.

When the loading apparatus is in the position shown in solid lines in FIG. 1, a folded wheelchair is placed with the wheels between the extensions 24 and 25. The distance between the support member 17 and the handlebar 20 is selected to be greater than the thickness of the folded up wheelchair. After the chair is put in place, a securing strap 35 is extended over the wheelchair (as seen most clearly in FIG. 2) and fastened in a suitable manner around the upper horizontal support member 16 of the frame. To accomplish this, the strap 35 carries male and female fasteners on it which may be ordinary snap fasteners or the widely used nylon hook-and-eye type fasteners. The latter type of fastener is preferable since more flexibility in location of the fastener elements for accommodating different sized articles on the frame may be readily accomplished with this type of fastener. It should be noted that by attaching the arms 24 and 25 to the side members 14 and 15 with a pivotal connection, adjustment of the tension of the strap 35 across the wheelchair causes the bar 20 to engage the wheel chair to hold it firmly in place during subsequent loading and unloading operations.

Once the wheelchair has been loaded onto the frame and secured by the strap 35, it then is loaded into the trunk by lifting up the frame by the handles 21 and 22 and pushing on the handles to move the apparatus in a generally horizontal direction toward the open trunk. The track members 30 and 31 are constructed with links having mutually engaging portions which limit the radius of curvature or amount of bend which can be imparted to the track members 30 and 31 in either direction to an amount which causes the chain to assume the position shown in FIG. 1 with the track members extended. The tracks 30 and 31 roll out flat link-by-link to the position shown in FIG. 2 as the loading apparatus is pushed into the trunk. The user merely has to hold up one end of the apparatus and the track members 30 and 31 hold up and lower into the trunk the remote end of the frame and the load it carries. This substantially removes the burden of loading from the person using the apparatus, and it no longer is necessary to bend over and reach into the trunk with a cumbersome or heavy load to place it into the trunk of the automobile. In the fully loaded position, the channel members 30 and 31 extend in a generally straight line and lie flat on the floor of the trunk as illustrated in FIG. 2.

Reference should now be made to FIG. 7 which shows details of the individual chain-link elements which are used to form the tracks 30 and 31. Each of these tracks is formed of an alternating series of first and second types of links 40 and 41, interconnected by pins 45 to permit pivotal or rotational movement of the links about the pins 45 to the degree permitted by the configuration of the structures of the individual links 40 and 41. Both types of links 40 and 41 have an elongated U-shaped channel configuration. The links 41 have semi-circular ear extensions 46 located on each end of the side members of these links. The links 40 are narrower than the links 41, and fit inside the sides of the links 41 and are mounted in an inverted relationship with respect to the links 41. Thus, the open ends of the links 40 are facing upwardly as shown in FIGS. 6 and 7; and the open ends of the links 41 face downwardly in these same figures.

The side members of each of the links 40 are of a trapezoidal configuration and the long ends or extensions of the trapezoid are located on the open side of the link. These ends go beyond the pivot pins 45 and underneath the upper closed surface of the adjacent links 41, as shown most clearly in dotted lines in FIG. 7. Thus, with the construction shown in FIG. 7, the ends of the links 40 prevent any substantial flexure of the chain-link tracks 30 and 31 downwardly as viewed in FIG. 7 or as viewed in FIG. 2. This structure imparts substantial rigidity to the tracks 30 and 31 when the loader is extended to the position shown in FIG. 1 and prevent it from collapsing downwardly on itself, but instead force it to retain the rigid configuration shown in FIG. 1.

To accomplish the lifting function to raise the remote end of the loader a sufficient height to clear the upper edge of the trunk compartment, the leading and trailing edges 48 and 49 of the closed side of the links 41 attached to opposite ends of each link 40 are set back from the pins 45 as illustrated in FIG. 7. When the tracks then are bent in an upward direction, as viewed in FIG. 7 and as illustrated in FIGS. 1 through 5, these edges 48 and 49 engage the upper surface of the sides of the adjacent links 40 to limit the radius of curvature which can be obtained from tracks 30 and 31 in this direction. The angular limit which is imparted by the location of the edges 48 and 49 with respect to the pins 45 of FIG. 7 is indicated most clearly in FIG. 2 by the angle between the endmost link 41 and the next adjacent link 40 illustrated in the lefthand portion of this figure.

Reference now should be made to FIGS. 3 through 5 which show different configurations assumed by the trunk loading apparatus as it moved from the position shown in FIG. 2 to the loading/unloading position shown in FIG. 5. As described previously, to initiate unloading of an object carried by the apparatus, the handles 21 and 22 are raised upwardly so that the lower tubular members 14 and 15 of the frame clear the upper lip of the rear edge 11 of the trunk compartment. For most vehicles, this merely amounts to a lift of 6 to 8 inches and does not require lifting of the entire weight of the object to be unloaded since the other end of the side frame members 14 and 15 are pivotally mounted by the pins 27 and 28 to the tracks 30 and 31. The initial movement toward the right of the loader, as viewed in FIGS. 3 through 5, causes the first link 41 to start to fold toward the right as viewed in FIG. 2. At its other end, where the pins 27 or 28 pass through the corresponding link 41, the link continues to pivot with respect to the side members 14 and 15 until the upper ends (or left-most ends as viewed in FIGS. 2 through 5) of these members engage a fixed pin stop 50 which passes through the endmost links 41 in each of these tracks. Once this engagement is reached, the frame members 14 and 15 form a rigid interconnection with the two end links 41 which causes the continued rightward movement of the frame as illustrated in FIG. 3 to result in the lifting of the left end of the frame higher and higher link by link as the frame is withdrawn toward the right.

Once the over-center point of each of the interconnecting pins 45 between adjacent links 40 and 41 is reached, the track 30 or 31 snaps back in the other direction to a rigid linear configuration which is effected by the extended ends of the links 40 under the closed surfaces of the adjacent links 41 past the edges 48 and 49. This prevents the tracks 30 and 31 from folding back on themselves which would be highly undesirable.

Progressive movement of the trunk loading apparatus toward the right, as viewed in FIGS. 4 and 5, lifts the frame and the object it is carrying upwardly clear of the upper lip of the rear edge of the trunk opening until the end of the frame has been withdrawn from the trunk. In this position, the person unloading the trunk then drops the handles 21 and 22 to the ground, as shown in FIG. 5; and the track members 30 and 31 assume the generally curved configuration shown in FIG. 5. The object, such as the wheelchair, then may be removed from the frame.

Reloading of an object back into the trunk of the vehicle then merely constitutes a reverse of the above-described procedure. The object is placed on the frame and handle extensions 24 and 25, as described previously. The strap 35 is stretched over the object to be loaded and secured to the crossbar member 16. The user then lifts up on the handles 21 and 22 swinging the frame portion of the loader outwardly in a counter-clockwise direction, as viewed in FIG. 5, until the side members 14 and 15 are generally horizontal. Pushing the frame toward the left to the positions shown in FIGS. 4, 3 and 2, in that order, then causes the tracks 30 and 31 to move and lower the frame and its load into the trunk, ultimately reaching the position shown in FIG. 2.

The brackets 51, by which the tracks are anchored to the inside of the rear wall 11 of the trunk compartment or to the floor of the trunk, are pivotally mounted to the end link to permit this option. It is apparent from an examination of this trunk loading apparatus that minimal effort is required to install it in an automobile and that the small holes required for the fasteners used to attach the brackets 51 to the trunk interior are insignificant so far as any alteration of the trunk area is concerned. Removal of the device for subsequent use in a different vehicle is readily effected and the holes are easily filled.

The configurations of the links used to form the tracks result in a very simple construction but one which is capable of actually lifting the remote end of the frame and its load upwardly above the rear edge of the trunk simply in response to a horizontal pull on the handles attached to the frame. As a consequence, minimal physical effort is required to operate this trunk loader. The loader itself, including the tracks and the frame, is compact and occupies very little space in the trunk; so that maximum space is available for the storage of articles on the frame itself and in trunk areas adjacent the sides of the frame.

I claim:

1. An automobile trunk loading apparatus including in combination:
   frame means having first and second ends for supporting an object to be loaded into an automobile trunk;
   at least one chain-like linkage means extendible to a substantially straight line configuration and comprised of a plurality of pivotally attached interconnected links including mutual engaging portions to limit the minimum radius of curvature attainable by said linkage means to a predetermined amount;
   means pivotally attaching one end of said linkage means to a first end of said frame means; and
   means for attaching the other end of said means adjacent the linkage interior of the trunk opening near the rear edge thereof to permit said linkage means to extend therefrom and lie on the bottom of the trunk to cause the first end of said frame means to be located in the interior of the trunk remote from the rear edge thereof and to cause the second end of said frame means to be located near the rear edge of the trunk when said apparatus is in the trunk in the loaded position.

2. The combination according to claim 1 wherein said chain-like linkage means includes first and second chain-like linkage spaced apart from one another for attachment by said attaching means at said one and said other ends, respectively, to said first end of said frame means and the trunk opening near the rear edge thereof.

3. The combination according to claim 1 further including a handle attached to the second end of said frame means.

4. The combination according to claim 3 wherein said handle comprises a supplementary frame means pivotally attached to the second end of said frame means to accommodate objects of different sizes and shapes.

5. The combination according to claim 4 further including securing means for securing objects to said frame means.

6. The combination according to claim 1 wherein said interconnected links are further constructed with additional mutual engaging portions to limit the radius of curvature attainable by said linkage means on the side adjacent the floor of the trunk to a raidus which is substantially greater than the minimum radius of curvature attainable by said linkage means on the opposite side thereof.

7. The combination according to claim 6 wherein said linkage means is comprised of alternating, elongated, channel-shaped links of first and second types, each having a substantially U-shaped cross-section with the distance between the outside edges of said first links being less than the distance between the inside edges of said second links, said links being pivotally interconnected together in an alternating inverted relationship with the first links extending inside the second links to which they are pivotally connected, said first links having extensions on the edges thereof underlying the closed surface of the second links to establish the minimum radius of curvature of said linkage on the side adjacent the floor of the trunk, and the edge of the closed surface of said second link engaging the edges of said adjacent first links to establish the minimum radius of curvature attainable by said linkage on the opposite side thereof.

8. The combination according to claim 7 further including a handle attached to the second end of said frame means.

9. The combination according to claim 8 wherein said handle comprises a supplementary frame means pivotally attached to the second end of said frame means to accommodate objects of different sizes and shapes.

10. The combination according to claim 9 further including securing means for securing objects to said frame means.

* * * * *

UNITED STATES PATENT AND TRADEMARK OFFICE
CERTIFICATE OF CORRECTION

PATENT NO. : 4,073,395
DATED : February 14, 1978
INVENTOR(S) : Clyde H. Clement

It is certified that error appears in the above-identified patent and that said Letters Patent are hereby corrected as shown below:

Claim 1, Column 6, Line 16:
"a" should be --the--;

Claim 1, Column 6, Lines 17 & 18:
"said means adjacent the linkage" should be --said linkage means adjacent the--;

Claim 2, Column 6, Line 3:
"linkage" should be --linkages--.

Signed and Sealed this

Sixth Day of June 1978

[SEAL]

Attest:

RUTH C. MASON
Attesting Officer

DONALD W. BANNER
Commissioner of Patents and Trademarks